(12) United States Patent
Beesley et al.

(10) Patent No.: US 6,252,605 B1
(45) Date of Patent: Jun. 26, 2001

(54) SYSTEM AND METHOD FOR PACKING SPATIAL DATA IN AN R-TREE

(75) Inventors: Darin J. Beesley, Kansas City, MO (US); Stephen C. Robinson, Olathe; Thomas H. Walters, Gardner, both of KS (US)

(73) Assignee: Garmin Corporation (TW)

( * ) Notice: Subject to any disclaimer, the term of this patent is extended or adjusted under 35 U.S.C. 154(b) by 0 days.

(21) Appl. No.: 08/905,297

(22) Filed: Aug. 1, 1997

(51) Int. Cl.[7] .................................................. G06F 15/00
(52) U.S. Cl. ............................................................. 345/441
(58) Field of Search ................................... 345/441, 442, 345/440, 433, 419, 117, 121

(56) References Cited

U.S. PATENT DOCUMENTS

| | | | |
|---|---|---|---|
| D. 365,032 | 12/1995 | Laverick et al. | D10/78 |
| 4,613,913 | 9/1986 | Phillips | 360/51 |
| 4,646,015 | 2/1987 | Phillips | 324/253 |
| 4,686,642 | 8/1987 | Buxton et al. | 364/607 |
| 4,734,863 | 3/1988 | Honey et al. | 364/449 |
| 4,788,645 | 11/1988 | Zavoli et al. | 364/449 |
| 4,796,191 | 1/1989 | Honey et al. | 364/450 |
| 4,811,491 | 3/1989 | Phillips et al. | 33/366 |
| 4,811,613 | 3/1989 | Phillips et al. | 74/5.6 |
| 4,914,605 | 4/1990 | Loughmiller, Jr. et al. | 364/518 |
| 5,204,817 | 4/1993 | Yoshida | 364/449 |
| 5,297,051 | 3/1994 | Arakawa et al. | 364/449 |
| 5,311,195 | 5/1994 | Mathis et al. | 342/357 |
| 5,546,107 | 8/1996 | Deretsky et al. | 395/600 |
| 5,905,507 | * 5/1999 | Rossignac et al. | 345/440 |

OTHER PUBLICATIONS

*On Packing R–trees,* by Kbrahim Kamel, et al., Second International Conference on Information and Knowledge Management, Nov., 1993.

*DOT: A Spatial Acess Method Using Fractals,* by Christos Faloutsos, et al., International Conference on Data Engineering, Apr., 1991.

*The R–tree: An Efficient and Robust Access Method for Points and Rectangles,* by Norbert Beckmann, et al., 1990.

*Direct Spatial Search on Pictorial Databases Using PAcked R–trees,* by Nick Roussopoulos, et al., Conference on Management of Data, May, 1985.

*R–Trees: A Dynamic Index Struture For Spatial Searching,* by Antonin Guttman, Proc. of the ACM–Sigmod 1984 International Conference on Management of Data, Jun., 1984.

* cited by examiner

Primary Examiner—Phu K. Nguyen
(74) Attorney, Agent, or Firm—Devon A. Rolf; Garmin Corporation

(57) ABSTRACT

A system and method for constructing an R-Tree index structure, and packing spatial data in the structure to permit parameters of the R-Tree to be constructed to be selected, within provided ranges, by an operator of the system. The spatial data features to be packed into the R-Tree constructed, are sorted, according to fractal geometry, and placed in a table of records. Each record is individually selected from the table, and data associated with each record is temporarily stored in one of a plurality of buffer storage locations according to a plurality of packing algorithms. The data in a buffer storage location is split, into first and second groups of data, upon the occurrence of one of a plurality of predetermined conditions. Data is selectively removed from the buffer for placement in the R-Tree being packed, such that data representing nearby geographical areas is most optimally clustered together. A portable electronic device such as a navigational aid, has a processor, a display, an input, and a memory, all housed by a housing, wherein the memory has spatial data indexed by an R-Tree index embedded therein.

12 Claims, 13 Drawing Sheets

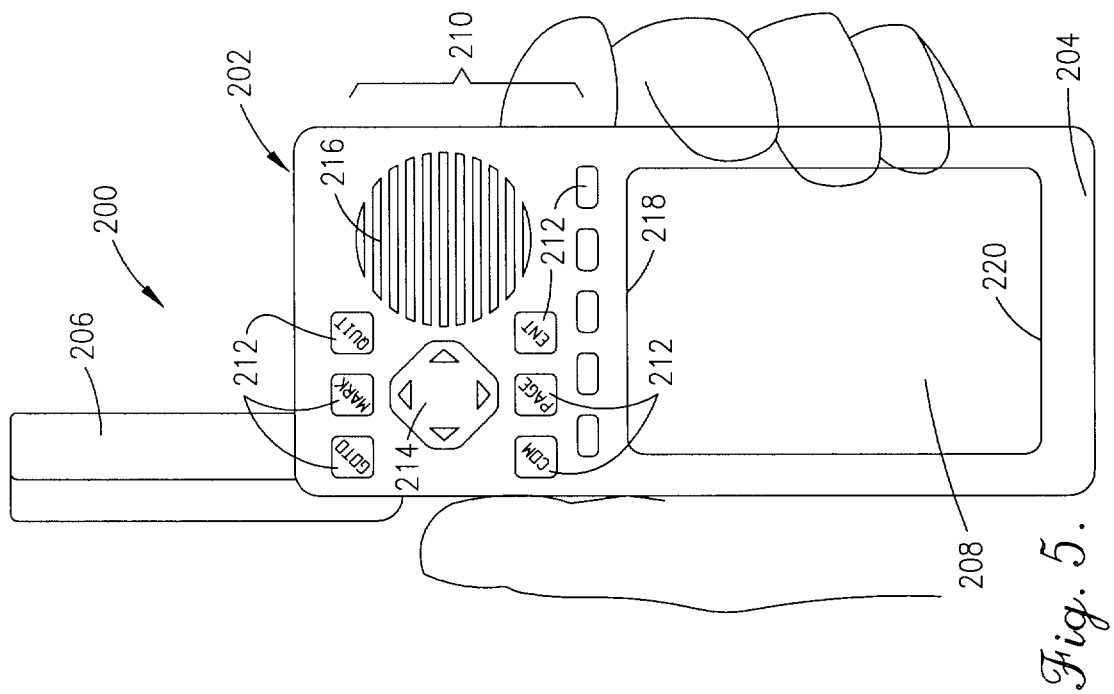
Fig. 5.
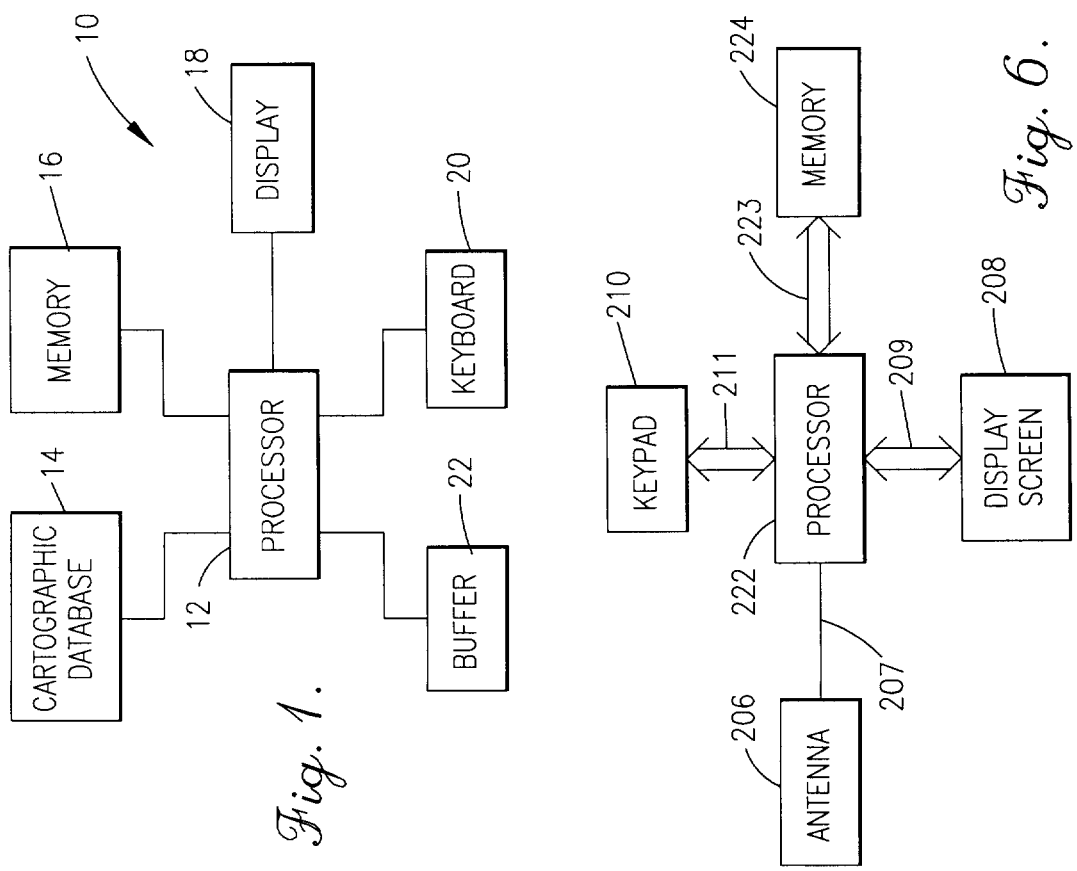
Fig. 1.
Fig. 6.

SYSTEM AND METHOD FOR PACKING SPATIAL DATA IN AN R-TREE

BACKGROUND OF THE INVENTION

1. Field of the Invention

The present invention is generally directed to a method and system for packing spatial data, such as cartographic data, into a database. More particularly, the invention relates to a method and system for packing cartographic data in a range-tree (R-Tree) to achieve flexible and efficient data storage. The invention further relates to a portable electronic device having cartographic data, and an associated R-Tree index structure, embedded therein.

2. Description of the Related Art

Many electronic products, such as mapping systems, computer aided design systems, and global positioning systems, require database storage of spatial data. Due to cost considerations, many of these products have tight restrictions on processor performance, and on available on-board memory for mass data base storage. Hardware restrictions of this nature are particularly troublesome for portable products, such as global positioning devices, involving embedded systems, because such systems require access to spatial (e.g., geographic/cartographic) data for mapping or navigation purposes. The volume of such data is quite large, and the available memory is limited by cost and physical size considerations.

One known and useful method of storing spatial data, in PC applications, utilizes an R-Tree index structure. R-Tree index structures allow the data to be accessed more efficiently than if randomly stored.

An R-Tree is a collection of nodes branched together in a meaningful or desired fashion. Conventional R-Trees are characterized by a root node representing at least the boundary of the entire spatial region packed and indexed by the R-Tree. All other nodes of the root are descendants of the root, with those nodes branched directly to the root being children of the root. Thus, the following statements are definitive of features in a tree structure, where x, y and z are nodes:

If x is an ancestor of y, y is a descendent of x;

If x and y are children of z, z is a parent of x and y, and x and y are siblings;

If x has no children, x is a terminal node, commonly referred to as a leaf;

If x is not a leaf, it is an internal or branch node, and must be a parent.

More particularly, in original R-Tree structures, point, linear, and areal data features to be organized are represented by their minimum bounding rectangles. A minimum bounding rectangle, or bounding box, describes the maximum and minimum latitude and longitude extents of an object. Each node of the tree contains a collection of minimum bounding rectangles. At the leaf level, a collection of spatial features are grouped geographically, so that nearby features are stored together. Upper (non-leaf) nodes group a collection of nearby lower-level nodes, and serve to index the sub-level spatially. Typically, the number of sub-nodes grouped by a particular node has a fixed limit, say N. When a feature needs to be added to the tree, specific algorithms are used to search the existing tree for a leaf-level node suitable to contain the new feature. As the number of sub-nodes contained exceeds N, the node is split, and changes are propagated up the tree structure. The overall structure grows to create a tree structure with a single node at the top, bounding the entire geographic area covered by the data base, and a collection of sub-levels, each of which covers a certain portion of the data coverage area. An R-Tree constructed this way grows dynamically (in width and height) as spatial features are added at the leaf level. The organization of the tree relative to the feature density in a particular geographic region is governed primarily by the value of N, which determines the number of sub-nodes (or features), at the leaf, the structure is able to represent. Given a specific rectangular area of interest, this data structure provides an efficient means to access spatial data.

Conventionally, leaf nodes in an R-Tree contain index record entries of the form (A, ID-Pointer) where "A" is a minimum bounding rectangle of the region indexed and "ID-Pointer" is a pointer to the region indexed. Particularly, in a two dimensional format, the rectangle A representing the indexed region is defined by $[X_{min}, X_{max}, Y_{min}, Y_{max}]$ and "ID-Pointer" is the address of the rectangle A.

Conventionally, non-leaf nodes contain entries of the form (A, Pointer), where A is the minimum bounding rectangle of all rectangles in the child node, and "Pointer" is the address of the child node. As set forth in R-Trees: A Dynamic Index Structure for Spatial Searching, 1994 by Antonin Guttman, incorporated herein by reference, a conventional R-Tree satisfies the following properties:

1. Every leaf node contains between m and M index records, unless it is the root, where M is the maximum number of entries that will fit in one node, and is a parameter, represented by $m \leq M \div 2$, specifying the minimum number of entries in a node.

2. For each index record (A, ID-Pointer) in a leaf node, A is the minimum bounding rectangle of the region identified by "ID-Pointer".

3. Every non-leaf node has between m and M children, unless it is the root.

4. For each entry (A, Pointer) in a non-leaf node, A is the minimum bounding rectangle of the rectangles in the child node to which "Pointer" is pointing.

5. The root node has a least two children, unless it is a leaf.

6. All leaves appear on the same level of the R-Tree.

Recently, it has been proposed to use fractal geometry, and particularly, the Hilbert Space-Filling Curve, to achieve better ordering of the rectangles to be packed in an R-Tree. As set forth in On Packing R-Trees, 1993, by Ibrahim Kamel and Christos Faloustos, which is incorporated herein by reference, the Hilbert Space-Filling Curve visits all coordinates in a grid (e.g., rectangle) exactly once, and never crosses itself. The Hilbert Space-Filling Curve is utilized in an attempt to achieve an improved clustering of rectangular regions to be packed in an R-Tree.

Further theoretical developments and studies of R-Trees are set forth in the following papers, each of which is incorporated herein by reference:

1. *The R\*-tree: An Efficient and Robust Access Method for Points and Rectangles*, 1990 by Norbert Beckman, et al.;

2. *The R+-Tree: A Dynamic Index For Multi-Dimensional Objects*, 1987 by Timos Sellis, et al.

3. *Direct Spatial Search on Pictorial Databases Using Packed R-trees*, 1985 by Nick Roussopoulos, et al.;

4. *DOT: A Spatial Access Method Using Fractals*, 1991 by Christos Faloutsos, et al.

While conventional R-Trees provide a useful indexing structure for spatial databases, current systems for developing R-Trees do not permit an operator flexibility in establishing useful parameters for the R-Tree. Additionally, while utilization of space-filling curves, when packing R-Tree nodes, has been theoretically proposed to enhance the packing efficiency of an R-Tree, it has been found that greater efficiency can be achieved in accordance with the buffering and packing techniques in accordance with the principals of the present invention, as described herein.

Accordingly, the need exists for a system and method for developing R-Tree index structures, which system is easy to configure for a variety of parameters. The need also exists for a system and method for packing R-Trees which improves the grouping, or clustering, of data representing different cartographic areas.

SUMMARY OF THE INVENTION

Accordingly, it is a primary object of the present invention to efficiently cluster data sets, representing various geographic regions or areas.

It is a further objection of the invention to generate an efficient R-Tree index structure.

It is an object of the invention to permit an operator to select configuration parameters for constructing an R-Tree index, and for packing spatial data.

It is a particular object of the invention to provide the ability to control the height and width of an R-Tree index structure.

An additional object of the present invention is to provide a buffering technique for enhancing clustering of spatial data.

An additional object of the invention is to embed cartographic data and an associated R-Tree index in a memory of a portable, hand held electronic device.

These and other objects are achieved by a method and system for constructing an R-Tree and, more particularly, a method and system for packing nodes of an R-Tree. The system has a processor connected to a database containing spatial data, such as cartographic data. A memory is connected to the processor and contains data representative of operator-selectable parameters and utility algorithms for permitting an operator to select parameters for defining a specific map and for creating an ASCII file indicative of the cartographic data pertaining to the defined map and further indicative of the selected parameters. An input, such as a keyboard, a display, and at least one additional memory location, including a buffer, are connected to the processor.

The processor reads cartographic data in the ASCII file and stores in memory the cartographic data, and data indicative of the selected parameters, in a database file. The processor runs a sorting and packing algorithm, according to the present invention, and develops an R-Tree index structure and packs nodes of the structure with spatial and/or indexing data, as described in detail below. Particularly, where, for example, the spatial data is cartographic data, an operator selects cartographic data from the database of spatial data for inclusion in the target product, such as a portable global positioning indicator with an embedded map. Utilizing the processor, the operator selects parameters for configuring the R-Tree index to be packed. Particularly, the system of the present invention permits an operator to select the number of layers in which spatial data features can be included in the R-Tree to be constructed, the maximum number of layers to be included in the R-Tree, the maximum number of layers in which each selected class of features (e.g., roads, waterways, etc.) may be packed, the number of storage locations to be available in the buffer which is used in accordance with the unique data packing technique of the present invention, one of a plurality of packing algorithms for packing the data into the nodes of the R-Tree, the target fanout of nodes above the first layer of the R-tree to be populated with features, the desired data storage size (in bytes) for each node of the R-tree, the maximum number of children nodes, or subfeatures, a given node at the next highest layer can index, and the maximum size, relative to geography, that a given R-Tree node may span. The system and method provides the configuration ability by having stored in memory a range, between minimum and maximum limits, within which each parameter may be selected by the operator with the keyboard, and established by the processor, based upon the selections of the operator.

Once the parameters for the R-Tree are selected, the processor calculates the minimum bounding rectangle for each spatial data feature to be packed. This calculation is performed in any conventional manner utilizing the known data coordinates associated with each feature. The processor further calculates an estimate of the memory storage requirements for each feature at each layer of the R-Tree into which the feature is to be populated. This latter calculation utilizes data input by the operator when configuring parameters relating to the layer number, in which each feature class is to be included for the R-Tree, as the appropriate top layer for each feature.

Once the minimum bounding rectangles are calculated, the processor initially sorts the cartographic data, in sets corresponding to the data features to be packed, utilizing fractal geometry. Preferably, the processor sorts the data indicative of the features to be packed by the Hilbert Curve Index (ascending) applied at the center of each minimum bounding rectangle corresponding to a feature to be packed. Coordinates of the minimum bounding rectangles, other than the center position, could be used in place of the center coordinate. The sorted data, indicative of the features to be packed, is sorted in a table of records. Each record contains data indicative of the cartographic feature to be packed and an estimate of the memory storage space needed to store the cartographic data, pertaining to that feature, at the present layer (e.g., the leaf layer, for the initial sort operation).

In accordance with a further sorting and packing process of the present invention, the processor retrieves from memory the data associated with a first record in the table created, and stores the cartographic data associated with the first record in a first storage location in the buffer. The processor retrieves from memory the data associated with a second record in the table, and also stores the cartographic data associated with the second record in the first storage location of the buffer. The process of storing cartographic data, associated with individual records in the table, continue until a predetermined condition exists.

Particularly, the data continues to be stored in a first storage location of the buffer until the memory storage requirement of the data is greater than the upper threshold as set by the operator, or the count of records to be grouped in this buffer storage location is greater than an upper threshold, as established by the operator, or the geographic size represented by the data within the first storage location is greater than an upper threshold, as selected by the operator. If any of the foregoing predetermined conditions exist, the data in the first storage location must be split into two different storage locations. Splitting of the data into first and second groups, for storage in respective first and second buffer storage locations, is preferably accomplished by the system of the present invention selecting two seed records from the first buffer storage location, storing one seed record back into the first location, and the other seed record in the second storage location. The data associated with the remaining records stored in the first buffer storage location are assigned to one of the first and second storage locations using a quadratic split technique, such as previously taught by Guttman.

The processor retrieves another record from the table of records, and determines into which of the first and second buffer storage locations (e.g., of those buffers storage locations having data stored therein) the selected data should be stored. This determination is made by running one of a plurality of data packing algorithms selected by the operator in accordance with the principles of the present invention. Particularly, one packing technique selects the buffer storage location, for storage of the selected data retrieved, which minimizes the increase in the perimeter of a minimum bounding rectangle of all the data in the buffer storage location, were the selected data to be stored in that location. Another packing technique of this invention selects the buffer storage location, for storage of the selected data retrieved from the table, that minimizes the increase in the area of a minimum bounding rectangle representing that data. Still a third packing technique selects the buffer storage location, for storage of the selected data retrieved, that minimizes the increase in overlap among all minimum bounding rectangles in that buffer storage location.

Once packing in this manner is completed, it must again be determined if a preexisting condition requiring a split of the data is present. If such a condition exists, the buffer storage location just filled must be split according to the described technique, resulting in a third buffer storage location having data therein.

The foregoing process is repeated until there are no more records in the table, or until all buffer storage locations are used, and there are no additional empty locations, so that a data split cannot be completed. In the event all buffer storage locations are used, and a further data split cannot be completed, then the data in one buffer storage location must be removed to free up a location. In accordance with the principles of the present invention, where the data represents cartographic data, that data, representing geography most likely the furthest from the geography represented by the data associated with the next record to be packed (e.g., the data associated with the most recently selected record), is removed from the buffer and archived into a final database. The removed data is thus considered fixed, or committed to the R-Tree being constructed and packed. Preferably, the buffer storage location containing the data to be removed is selected by applying the Hilbert Index Curve to the center of the minimum bounding rectangle representing the data in each buffer storage location. Once all records in the table have been selected, and the data associated with each record has been stored in a buffer storage location, or archived to the final database, the contents of all remaining buffer storage locations are archived to the final database.

Next, for other layers of the tree, the entire process is repeated. Particularly, on the second pass, rather than packing single features, as at the first layer, the minimum bounding rectangles representing each node (e.g., archived buffer storage location) packed at the first layer are sorted by fractal geometry, and placed in a table. The minimum bounding rectangles are then grouped or clustered, according to the buffering and packing process previously described, by carrying out the buffering and packing technique of the present invention for each record in the table. This process is repeated until all layers of the tree have been packed.

Once the desired spatial database and R-Tree index structure are developed, the processor processes the cartographic data in the final database to compress it using any conventional data compression algorithm, thus creating a final image file. In accordance with an aspect of the invention, the final image file, including cartographic data and its associated R-Tree index structure, are stored on an embedded hardware system, for use in a portable electronic device. Preferably, one such device is a portable, hand-held navigation aid having a housing for housing a processor, which is connected to a display, an input, and a memory. The memory has the spatial data and associated R-Tree index embedded therein.

BRIEF DESCRIPTION OF THE DRAWINGS

The objects and features of the invention noted above are explained in more detail with reference to the drawings, in which like reference numerals denote like elements, and in which:

FIG. 1 illustrates a block diagram of a system for sorting and packing data in an R-Tree index structure, according to the present invention;

FIG. 5 illustrates a front view of a portable electronic device according to the present invention; and FIG. 6 illustrates a block diagram of the circuit for the portable electronic device of FIG. 5.

DETAILED DESCRIPTION OF THE INVENTION

Figure 2A:
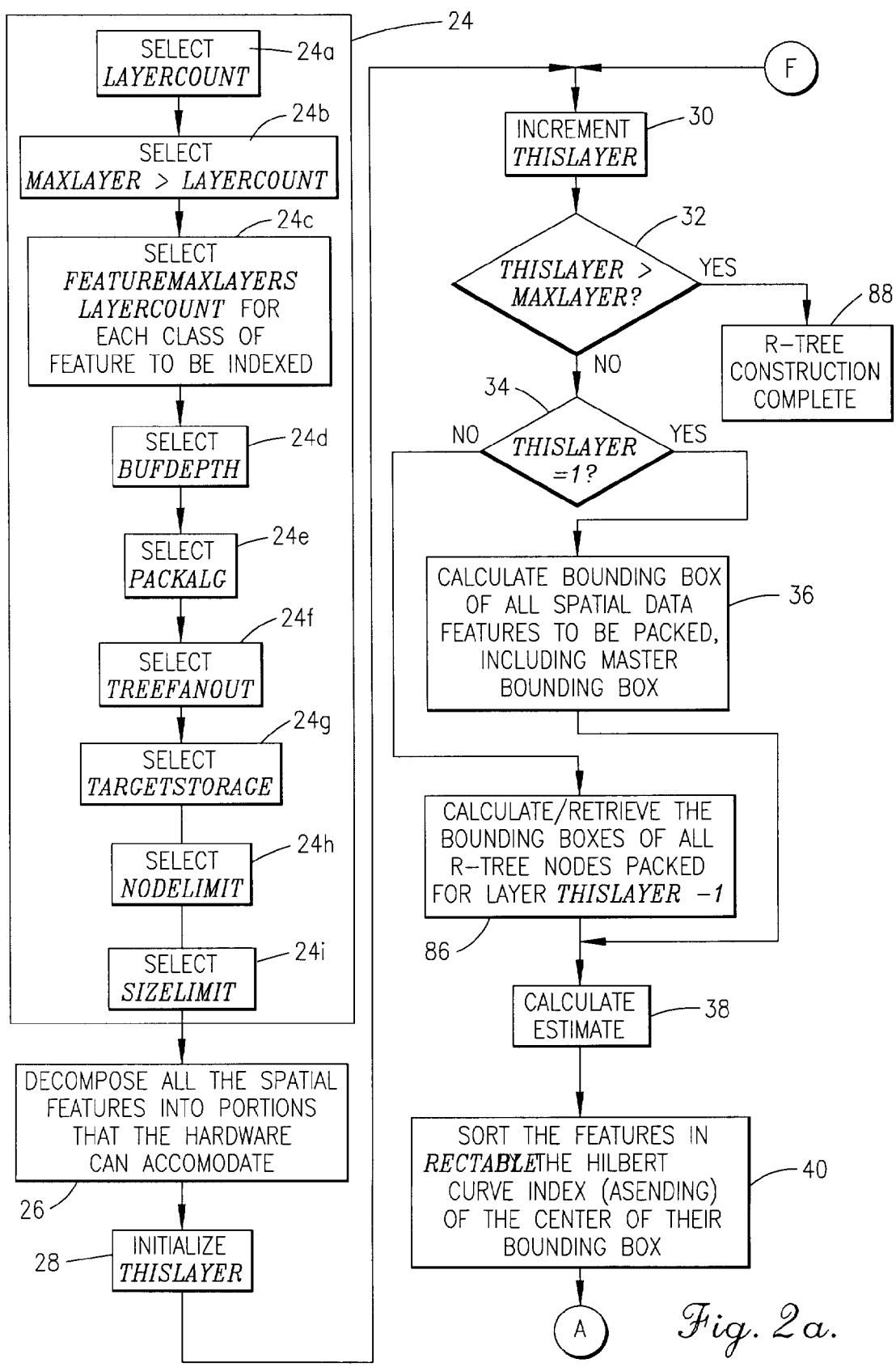
FIG. 2 illustrates a flow chart of a main routine for constructing and packing an R-Tree index structure.

With reference initially to FIG. 1, a system for constructing an R-Tree index structure, and packing nodes of the R-Tree index structure, is designated generally by the reference numeral 10. System 10 has a processor 12. Each of a memory comprising a cartographic data base 14, a memory 16, a display 18, a keyboard 20, and a buffer 22 are connected to processor 12. Processor 12 may be any conventional processor. However, processor 12, display 18, and keyboard 20 are preferably part of a conventional personal computer (PC). Memory 16 is illustrated as a single block in FIG. 1. However, as can be readily appreciated by those skilled in the art, an in view of the discussion below, memory 16 may comprise multiple memory locations or discs for storage of various types of routines and data utilized and/or generated by the present invention. Additionally, it will be understood that buffer 22 is a memory storage area, and may be a part of memory 16, or another memory, and is illustrated as a separate block for illustrative purposes.

Figure 2B:
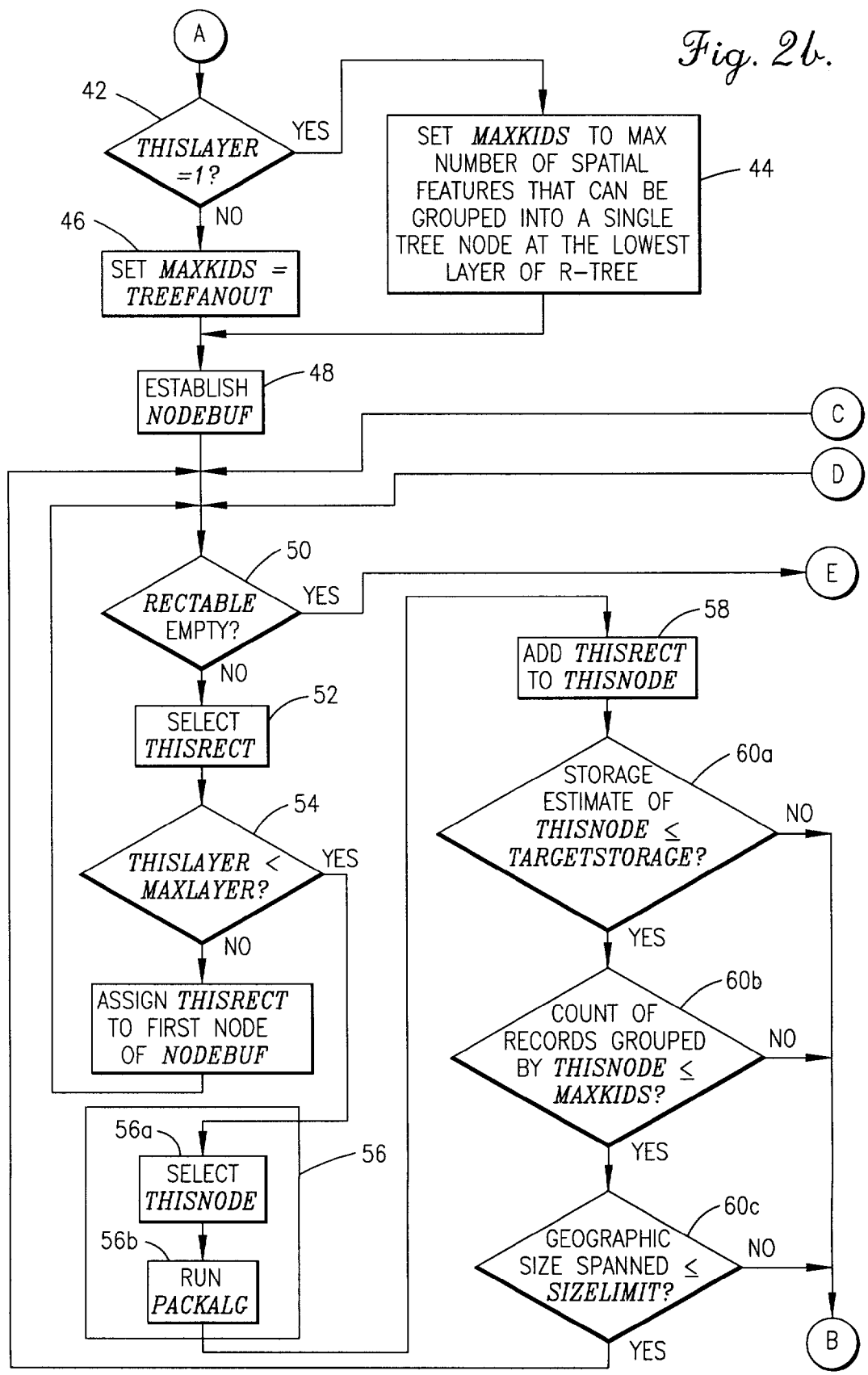
Figure 2C:
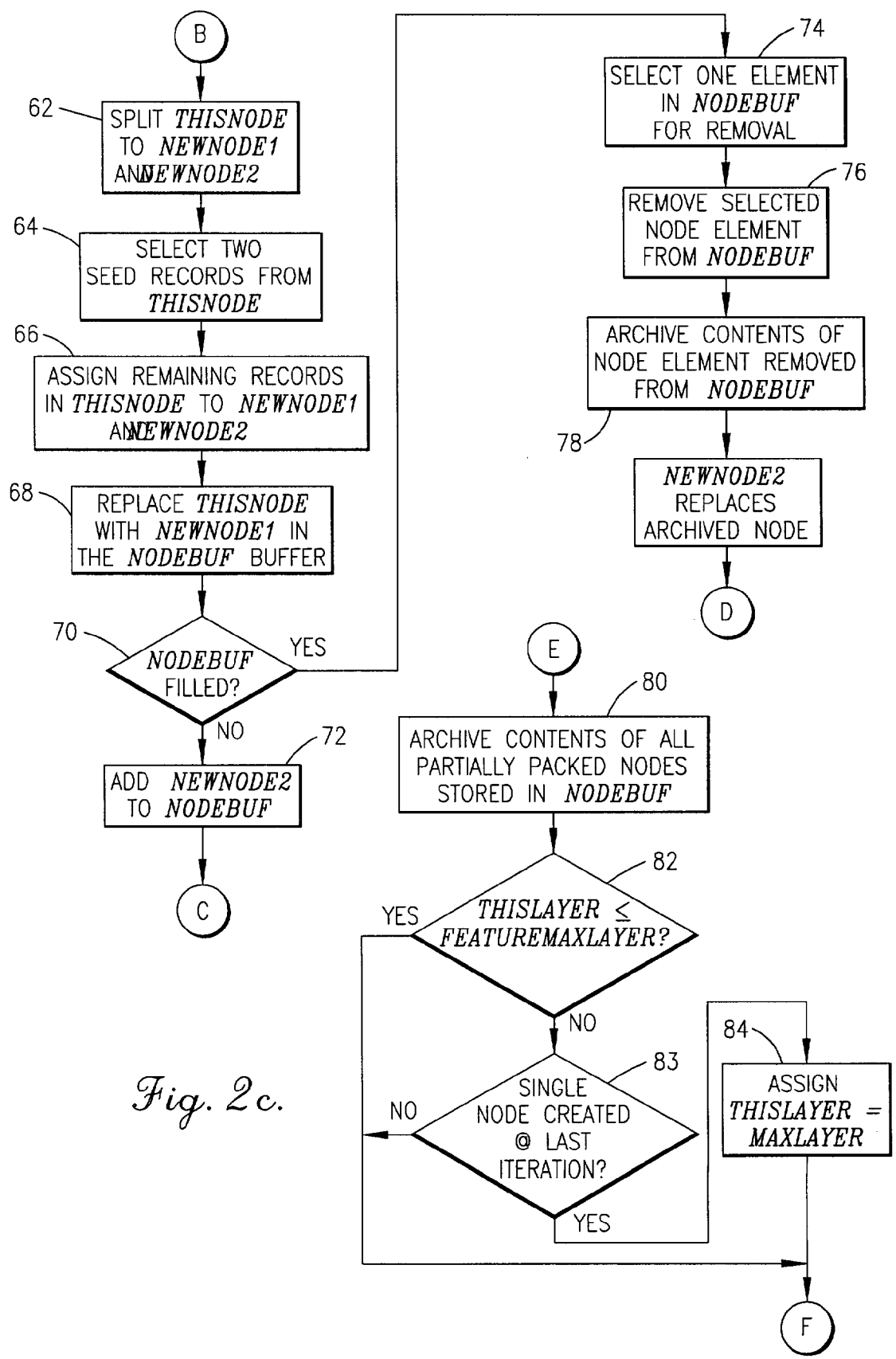

With additional reference to FIG. 2, the system 10 of FIG. 1, and a method carried out through use of the system 10 of FIG. 1, for constructing and packing an R-Tree, is described in detail.

With reference to reference numeral 24 of FIG. 2, a series of initial operational steps are described. Initial operational steps 24 are carried out by an operator of system 10, utilizing keyboard 20 for controlling processor 12 in the selection of parameters, for defining the R-Tree index structure to be developed. Particularly, at step 24a entitled "SELECT LAYERCOUNT", an operator of system 10 selects the number of layers to be populated with features within the R-Tree to be constructed. For example, a geographical feature represented by cartographic data may be a point, a line, or an area. Specifically, the portion of a highway, river, or boundary (e.g., a state or county boundary) are examples of linear features, cities on a map may be examples of point features, while buildings, lakes, etc. are examples of areal features. As will be readily understood, prior to implementation of the present invention, in the case of cartographic data, various common features are identified by, for instance, a cartographer to be within a given class. For example, interstate highways may be in one feature class, state highways and roads in a second feature class, rivers and waterways in a third feature class, and geographical boundaries in yet another feature class.

Step 24 begins the process of generating an R-Tree index structure to be packed with data. Step 24 permits the operator to specify specific parameters that will affect the outcome of the R-Tree index structure. Particularly, memory 16 contains upper and lower thresholds for the various parameters, and the operator utilizes keyboard 20 to control processor 12 to select an appropriate parameter within the specified range.

In accordance with the principles of the present invention, for the operation at step 24a of SELECT LAYERCOUNT, the operator can select anywhere from one to eight layers. In this way, depending upon a variety of factors, such as the resolution desired or required in the map to be generated, or the available memory, etc., the operator selects an appropriate number of layers to achieve a desired result. At step 24b, SELECT MAXLAYER, the operator selects a maximum layer number for the R-Tree which, of course, must be greater than a number of layers selected at 24a into which features may be populated. The MAXLAYER is the highest allowable layer for the tree. As will be appreciated by those skilled in the art, as construction of the R-Tree approaches the top layer, everything that is indexed spatially underneath that top layer is umbrellaed under a single region, or minimum bounding rectangle, at that top layer. In accordance with the preferred principles of the present invention, the populated layers can range from layers 0 to 7, and the top layer (e.g., MAXLAYER) can be set at a maximum of 8, where layer zero comprises the leaf nodes.

At step 24c, for each class of feature to be indexed, the operator selects the maximum layer number in which a particular feature class will be included, represented by "SELECT FEATUREMAXLAYER" less than or equal to "LAYERCOUNT". For example, given a set of cartographic data, each class of features has a top layer in which the features in the class will be included. For example, residential roads may be one class of feature, county roads a second class of feature, state roads a third class of feature, and interstate highways a fourth feature class. Utilizing system 10, the first feature class could be designated for inclusion only in the lowest layer of the tree, namely layer zero. The second feature class (county roads) could be designated for inclusion in layers zero and one, and thus the operator would select one as the highest layer of the tree for inclusion of this feature class. The state roads, feature class 3, may be designated for inclusion in first, second, and third levels of the tree, and thus the operator would select layer 2 as the "FEATUREMAXLAYER". Similarly, the interstate highways feature class 4, might be designated for inclusion in the fourth level of the tree, or layer 3, such that the operator would select layer 3 as the "FEATUREMAXLAYER". In this way, once the R-Tree index structure of the present invention and the final image file is created, a user desiring a high resolution view of a map could access the data at layer zero of the map, and retrieve all pertinent data, including the data in each feature class. In other words, the user could access the residential roads, county roads, state roads, and interstate highways. However, if it was desired only to view the state roads and interstate highways, then the user need access only the third and fourth levels of the map, or layers 2 and 3 correspondingly, to view those classes of features.

At step 24d, "SELECTBUFDEPTH" the operator selects a number of individual storage locations to be included in buffer 22. In accordance with the preferred principles of the present invention, system 10 provides up to 16 buffer storage locations. As described in greater detail below, each buffer storage location corresponds to a geographical region, or node, to be packed.

As indicated at step 24e, the operator carries out the step of selecting "PACKALG", the node grouping algorithm to be applied during construction of the R-Tree. As set forth in detail below, the present invention provides three distinct packing techniques, implemented by algorithms, for packing the R-Tree constructed. At step 24e, the operator utilizes keyboard 20, to control processor 12, for defining the particular packing algorithm to be utilized by system 10 during construction of the R-Tree.

As indicated at step 24f, the operator selects "TREEFANOUT", the target fanout of nodes above the first layer of the map to be populated with features. The selection of "TREEFANOUT" controls the height and width of the tree indexing and the number of child nodes that will be grouped together under a given parent node. Particularly, treefanout defines the number of child nodes, in the top layers of the tree to be populated with data features, to be grouped together under a single parent node, where the parent is at the next higher level of the tree.

At step 24g, the operator selects "TARGETSTORAGE", the desired data storage usage (in bytes) for each node of the tree. The value entered by the operator determines how much spatial data will be allowed within each node.

At step 24h, the operator selects "NODELIMIT", the maximum number of subfeatures or nodes a given node can index.

At step 24i, the operator selects "SIZELIMIT", the maximum size geographically that a given R-Tree node can span. As discussed below, this size limitation can be utilized to increase the number of nodes in an R-Tree, which could ultimately improve search performance for certain spatial data sets.

Once the operator has entered selection at step 24a–24i, the selections are stored in memory 16. Cartographic data, relevant to a geographical area that the final image file is to cover, is downloaded from the cartographic data base 14, and processor 12 generates a large ASCII file, indicative of the relevant cartographic data, and also indicative of all of the parameters for the R-Tree to be constructed, as selected at step 24.

As indicated at step 26, processor 12 carries out an operation (if necessary) to decompose all of the spatial features to be packed into portions that target hardware, such as a portable electronic device, can accommodate. In this regard, the cartographic data is data intense, and it may be necessary or desirable to decompose the cartographic data to smaller individual cartographic features. For example, in the case of a line, decomposition may result in several lines. Once the cartographic data is decomposed as necessary, or desired, processor 12 initializes "THISLAYER", the current map layer being packed, to zero. At step 30, processor 12 increments "THISLAYER" to one, and at processing step 32, the processor determines whether this layer is greater than MAXLAYER, where MAXLAYER was selected by the operator at step 24b. For example, during initial processing, the current layer of the R-Tree to be constructed and packed, layer zero, corresponds to a first level of the R-Tree. Accordingly, during the initial processing loop, processor 12 determines at step 34 whether THISLAYER is equal to one. When THISLAYER is equal to one, indicating an initial level of the tree is to be packed, bounding boxes, or minimum bounding rectangles, of all spatial data features to be packed are calculated, as indicated at step 36. Additionally, a master bounding box in the form of a minimum bounding rectangle for the entire coverage area, is calculated. As indicated at step 38, for each initial data feature to be packed, processor 12 forms a calculation to estimate the memory storage requirements for each feature at each layer of the R-Tree to be constructed into which the feature will be populated. As stated above, for each spatial data feature, "FEATUREMAXLAYER", as selected by the operator, determines the appropriate top layer for the feature. In accordance with the principles of the present invention, calculations for this estimate take into consideration effects of any conventional compression algorithms to be used to store the coordinate data, and the effects of any conventional smoothing and/or simplification transformations to be applied to the spatial data at each layer of the map. It should be understood that the estimate need not be precise, unless a hard limit on the number of storage bytes available for each node exists.

As indicated at step 40, processor 12 sorts the spatial data features (or upper-level R-Tree nodes, depending on step 34) to be packed into a table, designated as "RECTABLE". Preferably, processor 12 conducts the sort by applying fractal geometry, and particularly the Hilbert Curve Index (ascending), at the center of each calculated minimum bounding rectangle corresponding to the spatial data features to be packed. The master bounding box calculated at step 36 can be used to establish the order of the Hilbert Curve required to span the coordinate range covered by the map.

At step 42, processor 12 determines whether "THISLAYER", the current layer of the R-Tree being packed, is one, indicating an initial pass through the processing loop, and indicating that the lowest level (level 0) of the tree is being packed. As indicated at step 44, when processor 12 determines that the current map layer being packed is one, processor 12 sets "MAXKIDS", the maximum number of records to be associated with a node, to the maximum number of spatial features that can be grouped into a single tree node at the lowest layer of the R-Tree, as defined by "NODELIMIT", selected by the operator at step 24h. When, however, processor 12 determines at step 42 that THISLAYER is not equal to one, such as on subsequent passes of the processing loop, processor 12 sets MAXKIDS, the maximum number of records associated with a node, to "TREEFANOUT", as selected at 24f by the operator, for controlling the number of subnodes that can be grouped together at R-Tree layers that are greater than one. Tree indexing width/height can thus be controlled.

At step 48, the processor 12 establishes NODEBUF, a buffer of BUFDEPTH nodes. To establish NODEBUF, processor 12 reads the first record from RECTABLE and stores it in NODEBUF as a read record. In accordance with the principles of the present invention, and as set forth in detail below, each record of NODEBUF will serve to describe all subnodes or features grouped together within a node, as well as storage usage numbers for all features present at the node. The buffering approach of the present invention allows nodes to be packed more optimally than existing implementations, and enhances natural ordering imposed by fractal geometry, and particularly, the Hilbert Space-Filling Curve.

Particularly, at step 50, processor 12 determines whether RECTABLE is empty. When RECTABLE, the table of records defining the spatial data features to be packed and associated storage estimates, is not empty, processor 22, at step 52, selects "THISREC", the next record in RECTABLE. As indicated at step 54, processor 12 determines whether THISLAYER is less than the MAXLAYER, again where THISLAYER is the current map layer being packed, and MAXLAYER was selected by the user at step 24b. When THISLAYER is indeed less than the selected MAXLAYER, processing advances to step 56, wherein processor 12 selects a node, designated by "THISNODE", corresponding to one of the BUFDEPTH buffer storage locations, for storage of the data associated with "THISREC", the record being processed. Particularly, "THISNODE", is the best node in NODEBUF to contain THISREC. THISNODE, the best node in NODEBUF, is selected according to the algorithm "PACKALG", itself selected by the operator at step 24e.

Figure 3A:
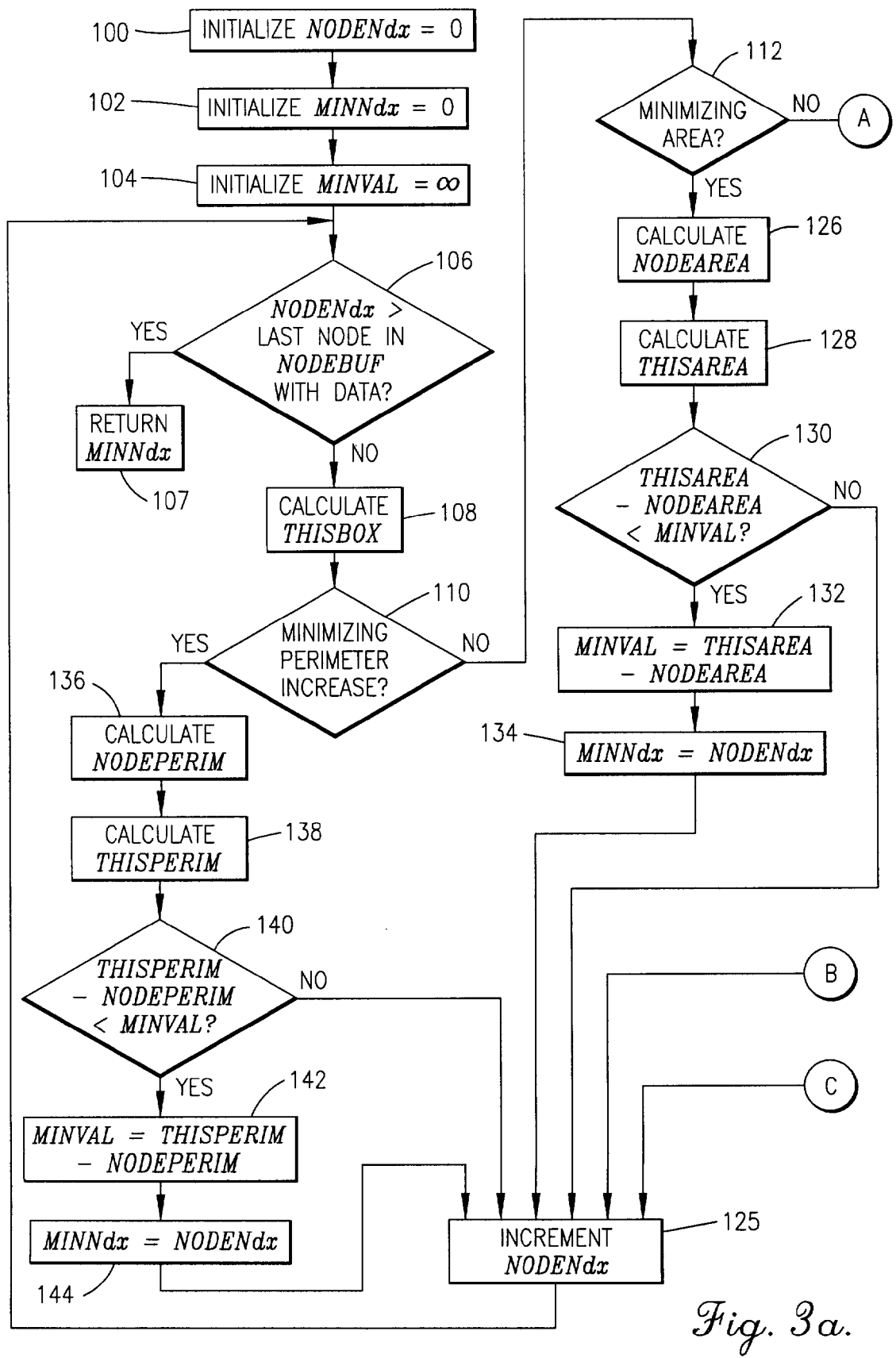
FIG. 3 illustrates a flow chart of a data packing routine of the present invention.
Figure 3B:
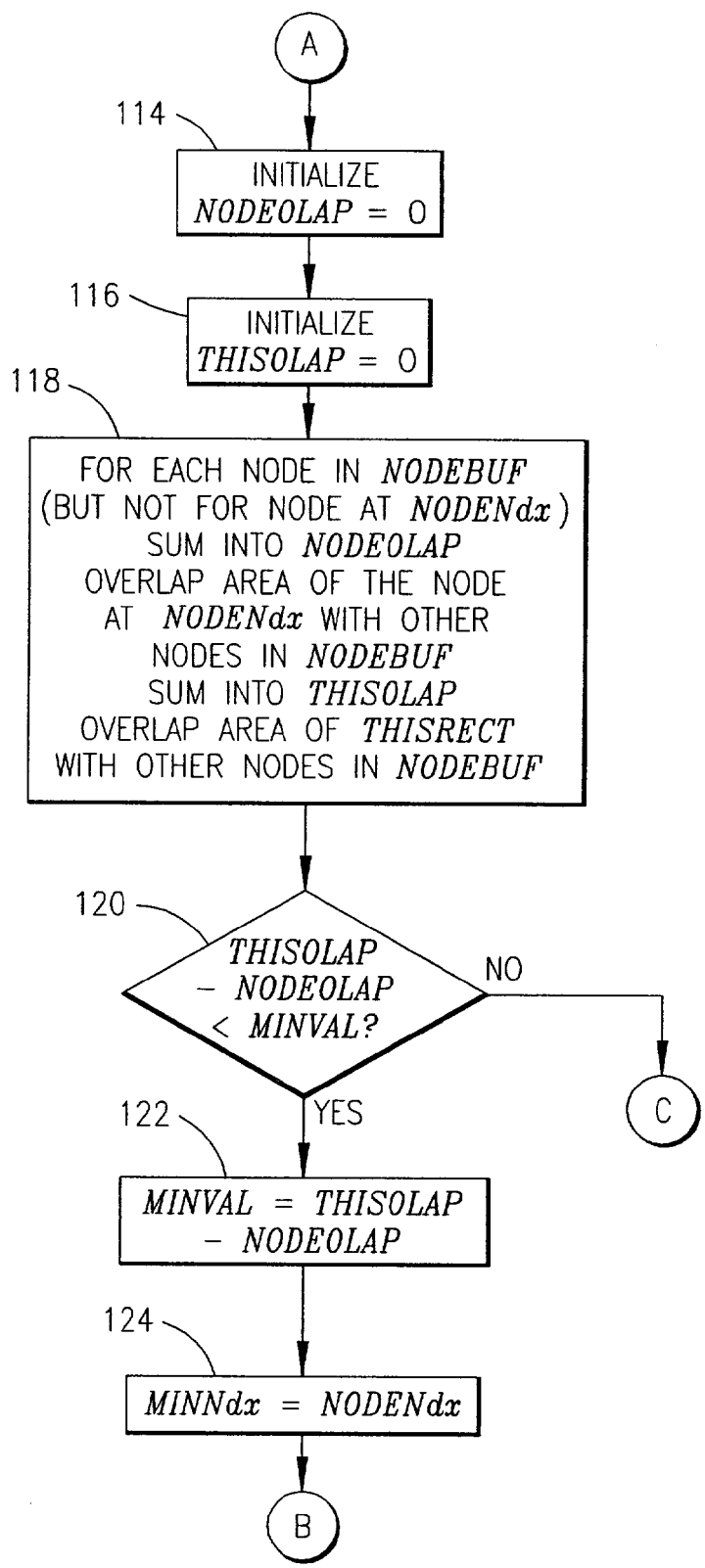

In accordance with the principles of the present invention, and with additional reference to FIG. 3, the present invention permits the operator to select a packing technique for packing the nodes of the R-Tree being constructed. Particularly, system 10 provides the availability to select the node (e.g., the BUFDEPTH buffer storage location), which minimizes the increase in the node bounding box perimeter. Alternatively, system 10 provides the ability to select the node (e.g., the buffer storage location) in the buffer which minimizes the increase in the node bounding box area, or, alternatively, system 10 provides the ability to select the node in the buffer which minimizes the increase in overlap among the minimum bounding rectangles for the nodes in NODEBUF. As indicated in FIG. 2, a portion of step 56, which includes selecting THISNODE, also includes running PACKALG, the packing algorithm selected at step 24e. The routine of PACKALG, as described in detail below with reference to FIG. 3, examines the contents of the NODEBUF buffer, and selects an existing node (e.g., BUFDEPTH buffer storage location) to return to the main processing routine of FIG. 2, based upon the currently selected packing algorithm. The node is selected that minimizes the increase in perimeter among the existing nodes, or, minimizes the increase in area among the existing nodes, or, minimizes the increase in overlap of minimum bounding rectangles among the existing nodes. Once THISNODE is selected, through utilization of PACKALG, at step 56, the data associated with THISREC, the record of the RECTABLE being processed, is added to THISNODE, the most optimum node available for inclusion of the data.

At steps 60a, 60b, and 60c, processor 12 determines whether a selected preexisting condition exists, such that THISNODE needs to be split into first and second nodes, as indicated at steps 62. Particularly, at step 60a, processor 12 determines whether the storage estimate of THISNODE, having the data associated with THISREC just added, is less than or equal to TARGETSTORAGE, the desired data storage usage for each node of the tree, and selected by the operator at step 24g. When the storage estimate of THISNODE is less than TARGETSTORAGE, processor 12 determines whether the count of records grouped by THISNODE is less than or equal to MAXKIDS. As defined above, MAXKIDS is equal to NODELIMIT at the lowest level of the tree, and is equal to TREEFANOUT at upper levels. When processor 12 determines at step 60b that the count of records grouped by THISNODE is less than or equal to MAXKIDS, processor 12 determines at step 60c whether the geographic size spanned by the data associated with THISNODE is less than or equal to SIZELIMIT, the maximum geographic data permissible as selected at step 24i.

When processor 12 determines that the storage estimate of THISNODE is greater than TARGETSTORAGE at step 60a, or that the count of records grouped by THISNODE is greater than MAXKIDS at step 60b, or that the geographic size spanned by the data in THISNODE is greater than the selected, permissible size limit at step 60c, processing proceeds to step 62 to split THISNODE into first and second nodes, as described below. However, when all of the conditions at step 60a, 60b, or 60c are met, processing returns to step 50, to determine whether the RECTABLE has an additional record in it.

When RECTABLE is not empty, processing proceeds again to step 52, where THISREC, the next record in the table, is selected, and processing is continued through the flow chart. When, however, due to the occurrence of one of the selected conditions at step 60a, 60b, or 60c, processing proceeds to step 62. As will be understood, an initial loop of processing will not require the data in "THISNODE" to be split, and processing will return to step 50, and subsequently step 52, for retrieval of the next record in RECTABLE. Processing will continue in this manner until, at some point, one of the preselected conditions of step 60a, 60b, or 60c will be met, such that THISNODE requires splitting into two nodes. As indicated at step 62, processor 12 splits THISNODE to NEWNODE 1 and NEWNODE 2 by, as indicated at step 64, selecting two seed records from THISNODE, and, as indicated at step 66, assigning the remaining records in THISNODE to NEWNODE 1 and NEWNODE 2, created at step 62. The splitting process of steps 62, 64, and 66 is preferably carried out by applying a quadratic split, in a known manner (such as taught by Guttman), to the data associated with THISNODE. As indicated at step 68, processor 12 replaces THISNODE with NEWNODE 1 in the NODEBUF buffer. At step 70, processor 12 determines whether the NODEBUF buffer is filled. Particularly, processor 12 determines whether each of the BUFDEPTH buffer storage locations are filled. As indicated at step 72, when the NODEBUF buffer is not filled, processor 12 adds NEWNODE 2 to NODEBUF, thus resulting in, during an initial processing of the loop, first and second BUFDEPTH buffer storage locations having data therein. Processing then returns to step 50, wherein processor 12 determines whether the RECTABLE is empty. Returning to step 70, when it is determined that NODEBUF is filled, indicating that each of the buffer locations are already filled, and it is not possible to add the second portion, NEWNODE 2 of a split node to the buffer, processor 12 must select one of the BUFDEPTH storage locations in the NODEBUF buffer for removal, as indicated at step 74. In accordance with the preferred aspects of the present invention, processor 12 selects the data of that buffer storage location for removal which is most likely represents a geographical area furthest removed from the data associated with THISREC, the record being processed. Preferably, processor 12 applies fractal geometry, and namely the Hilbert Space-Filling Curve (ascending), to the center of the minimum bounding rectangle of each buffer storage location. Processor 12 removes the data from the selected node (e.g., buffer storage location) from NODEBUF at step 76, and archives the contents of the removed node element (e.g., the contents of the removed buffer storage location), in memory 16, as indicated at step 78. NEWNODE 2 replaces the node vacated by the archival process.

Processor 12 then returns processing to step 50, when it A is again determined whether the RECTABLE is empty. When it is determined at step 50 that RECTABLE is empty, processing advances to step 80, wherein processor archives the contents of all partially packed nodes stored in NODEBUF. At step 82, processor 12 determines whether THISLAYER is less than or equal to FEATUREMAXLAYER. If THISLAYER, the layer of the tree being constructed, is indeed less than or equal to FEATUREMAXLAYER, the maximum layer wherein a class of features is to be populated, as determined at step 24c, then either more populated layers need to be packed, or the first layer of unpopulated nodes above FEATUREMAXLAYER are about to be packed (which unpopulated nodes partially index the tree but do not contain feature data at this point), and processing returns to step 30, where THISLAYER is incremented. When, however, it is determined at step 82 that THISLAYER is not less than or equal to FEATUREMAXLAYER, processing advances to step 83 where it is determined whether the last iteration generated just one node (which by definition covers the entire map). When only one node was created, processor 12 assigns, at step 84, THISLAYER the value of MAXLAYER, wherein the value of MAXLAYER is that which was selected at step 24b. Upon assignment of THISLAYER to MAXLAYER at step 84, processing returns to step 30, where THISLAYER is incremented. When, at step 83, it is determined that more than one node was created at the last iteration, processing returns to step 30, so that upper layers of the tree can be indexed. Upon return of the loop to step 30, and upon incrementing THISLAYER, processor determines at step 32 whether THISLAYER is greater than MAXLAYER. When processor 12 determines that THISLAYER is not greater than MAXLAYER, such as on a second pass of the loop in a greater than two layer tree, processing advances to step 34. At step 34, processor 12 determines whether THISLAYER equals one and, since THISLAYER is incremented at step 30, after the initial processing loop, processor 12 would determine that THISLAYER is not equal to one, and processing will advance to step 86. At step 86, processor 12 calculates the minimum bounding rectangles, or bounding boxes, for all R-Tree nodes packed from the previous layer, THISLAYER minus one.

Processing then returns to step 38, wherein processor 12 calculates an estimate of the storage requirements for data within each calculated minimum bounding rectangle, and processing advances to step 40, wherein the records in the RECTABLE are sorted by the Hilbert Space-Filling Index Curve. Processing then continues through the processing steps in the manner as previously described. As the R-Tree is constructed, and the layers are built, at some point, at step 30, THISLAYER will be incremented so that it equal MAXLAYER. When this occurs, processor 12 will determine at step 54 that THISLAYER is no longer less than MAXLAYER, and thus the data associated with the THISREC record of the RECTABLE will be assigned to the first node of NODEBUF, and processing will return to step 50, and the data associated with each additional record in the RECTABLE will be assigned to the first node of the node buffer. This will be understood, because at the MAXLAYER of the tree, only a single root node exists, and further splitting of the node is not possible. Once processor 12 determines at step 82 that THISLAYER is not less than or equal to FEATUREMAXLAYER, and processor 12 assigns THISLAYER the value of MAXLAYER at step 84, and THISLAYER is incremented at step 30, processor 32 will determine that THISLAYER is now greater than MAXLAYER, and processing will advance to step 88, and R-Tree construction is complete.

Upon completion of the R-Tree structure, data that was archived into the final database is preferably compressed by processor 12 to develop a final map image for use on an embedded hardware system, such as found in a portable electronic device, such as a portable navigation aid. Prior to compression into a map image for embedded use (but outside the scope of the invention), it is understood that cartographic data must be populated into tree nodes above the leaf. Typically, this is done by transforming the leaf data using conventional smoothing/simplification techniques, and placing the transformed data into all upper layers of the tree that are to hold cartographic data. In this way, more generalized cartographic data is available for use by the embedded product, suitable for use at widely varying zoom levels. The goal is to utilize the R-tree indexing together with cartographic feature generalization to obtain a map suitable for viewing within a specified zoom range (implementation-dependent).

With reference now to FIG. 3, the packing algorithm, PACKALG, of the present invention is illustrated and described. As indicated at step 100, processor 12 initializes NODENdx to zero. At step 102, processor 12 initializes MINNdx to zero, and at step 104, processor 12 initializes MINVAL to infinity. As will be appreciated from the following discussion, NODENdx is the present node for consideration for inclusion of the spatial data associated with THISREC, the record being processed. As indicated at step 106, processor 12 determines whether NODENdx is greater than the last node in NODEBUF having data stored therein. In other words, BUFDEPTH, when the total number of buffer storage locations available in the buffer is 16 (as selected at step 24 by the operator), but only five of those buffer storage locations have data stored therein, processor 12 determines at step 106 whether the current value of NODENdx is greater than five. In the initial processing loop of PACKALG, NODENdx has been initialized to zero and there is a sole seed record in NODEBUF, as previously described.

When it is determined, at step 106, that NODENdx is not greater than the last node in NODEBUF having data therein, processing advances to step 108, wherein processor 12 calculates THISBOX, the minimum bounding rectangle of the node at NODENdx if the data of THISREC were added. Processing then advances, such that processor 12 determines the particular packing technique selected by the operator at step 24e in FIG. 2. Particularly, at step 110, processor 12 determines whether the particular packing technique selected should minimize the increase in the perimeter of the minimum bounding rectangle. When it is determined that minimizing the perimeter of the minimum bounding rectangle is not the packing technique selected, processing advances to step 112, wherein processor 12 determines whether the packing technique selected minimizes the area of the minimum bounding rectangle of the selected buffer storage location. When processor 12 determines at step 112 that the packing technique selected is not to minimize the area of the minimum bounding rectangle, processor 12 then understands that the packing technique selected by the operator is to minimize the overlap of minimum bounding rectangles within the buffer storage location to be selected, and processing advances to step 114.

When carrying out the routine wherein it is determined at steps 110 and 112 that the packing technique selected was not to minimize the increase in perimeter or to minimize the increase in area of the minimum bounding rectangle, processor 12, at step 114, initializes NODEOLAP to zero, and at step 116, initializes THISSOLAP to zero. At step 118, or each node in NODEBUF, except the node at NODENdx, processor 12 sums into NODEOLAP the overlap area of the node at NODENdx with the other nodes in NODEBUF, and sums into THISOLAP the overlap area of THISREC with the other nodes in NODEBUF. At step 120, processor 12 determines whether the difference between THISOLAP and NODEOLAP is less than MINVAL. When it is determine at step 120 that this difference is less than MINVAL, processing advances to step 122, and the value of MINVAL is assigned the value of the difference between THISOLAP and NODEOLAP. At step 124, processor 12 then assigns the value of MINNdx to be NODENdx, and processing advances to step 125, wherein NODENdx is incremented by one. When, however, it is determined at processing step 120 by processor 12, that the difference between THISOLAP and NODEOLAP is not less than the value of MINVAL, processing proceeds directly to step 125, and NODENdx is incremented. From step 125, processing returns to step 106, to determine if NODENdx is greater than the last node in the node buffer, as previously described. Processing in this manner continues until NODENdx is greater than the last node, and processor 12 then returns MINNdx to the main processing routine. As will now be understood, when the user selects as the packing technique to select the node (e.g., buffer storage location) for inclusion of data which will result in minimal overlap of minimum bounding rectangles), processor 12 determines the overlap of minimum bounding rectangles for each buffer storage location in which the data of THISREC might be included, and selects the buffer storage location yielding the minimal overlap of minimum bounding rectangle.

Returning now to step 110 and 112, when it is determined by processor 12 in step 110 that the packing technique selected is not to minimize the increase in perimeter of a minimum bounding rectangle in a particular buffer storage location, processing advances to step 112. When it is determined at step 112 that the packing technique selected is to select the buffer storage location which minimizes the area within the minimum bounding rectangle, processing advances to step 126, wherein processor 12 calculates NODEAREA, the area of the existing node at NODENdx. Processing then advances to step 128, wherein processor 12 calculates THISAREA, the area of THISBOX, which itself was calculated at step 108. At step 130, processor 12 determines whether the difference between THISAREA and NODEAREA is less than minval, initially established at infinity. Thus, upon the first pass, as similarly happened at step 120 in an alternate packing technique, processor 12 will certainly determine that the subject difference is less than MINVAL, and processing advances to step 132, wherein MINVAL is assigned the value of the difference between THISAREA and NODEAREA. Processing then advances to step 134, where processor 12 assigns to MINNdx the value of NODENdx, and processing advances to step 125, where NODENdx is incremented. Processing then returns to step 106, and the process is repeated until it is determined that NODENdx is greater than the last node in NODEBUF in which data is contained, in which case processing advances to step 107, where processor 12 returns MINNdx, that buffer location in which the data associated with THISREC, when added with THISNODE, yielded a minimum increase in area of the minimum bounding rectangle associated with the particular buffer storage location.

When it is determined at step 110 that the packing technique selected is to minimize the increase in perimeter of the minimum bounding rectangle of a buffer storage location, processing advances to step 136, where processor 12 calculates NODEPERIM, the perimeter of the existing node at NODENdx. Processing then advances to step 138, where processor 12 calculates THISPERIM, the perimeter of THISBOX, which was itself calculated at step 108. At step 140, processor 12, in a similar manner as with the other packing techniques, determines whether the difference between THISPERIM and NODEPERIM is less than MINVAL. When the difference between THISPERIM and NODEPERIM is less than MINVAL, processing advances to step 142, where MINVAL is assigned the value of the difference between THISPERIM and NODEPERIM, and processing advances to step 144, where processor 12 assigns MINNdx the value of NODENdx. Processing then advances to step 125, where NODENdx is incremented, and processing returns to step 106. When it is determined at step 140 that the difference between THISPERIM and NODEPERIM is not less than the value of MINVAL, processing proceeds directly to step 125, for incrementation of NODENdx. This process is repeated until the value of NODENdx is greater than the last node in NODEBUF containing data, in which processing advances to step 107, returning MINNdx, the buffer storage location in which inclusion of the data associated with THISREC experiences the minimal increase in perimeter.

Figure 4A:
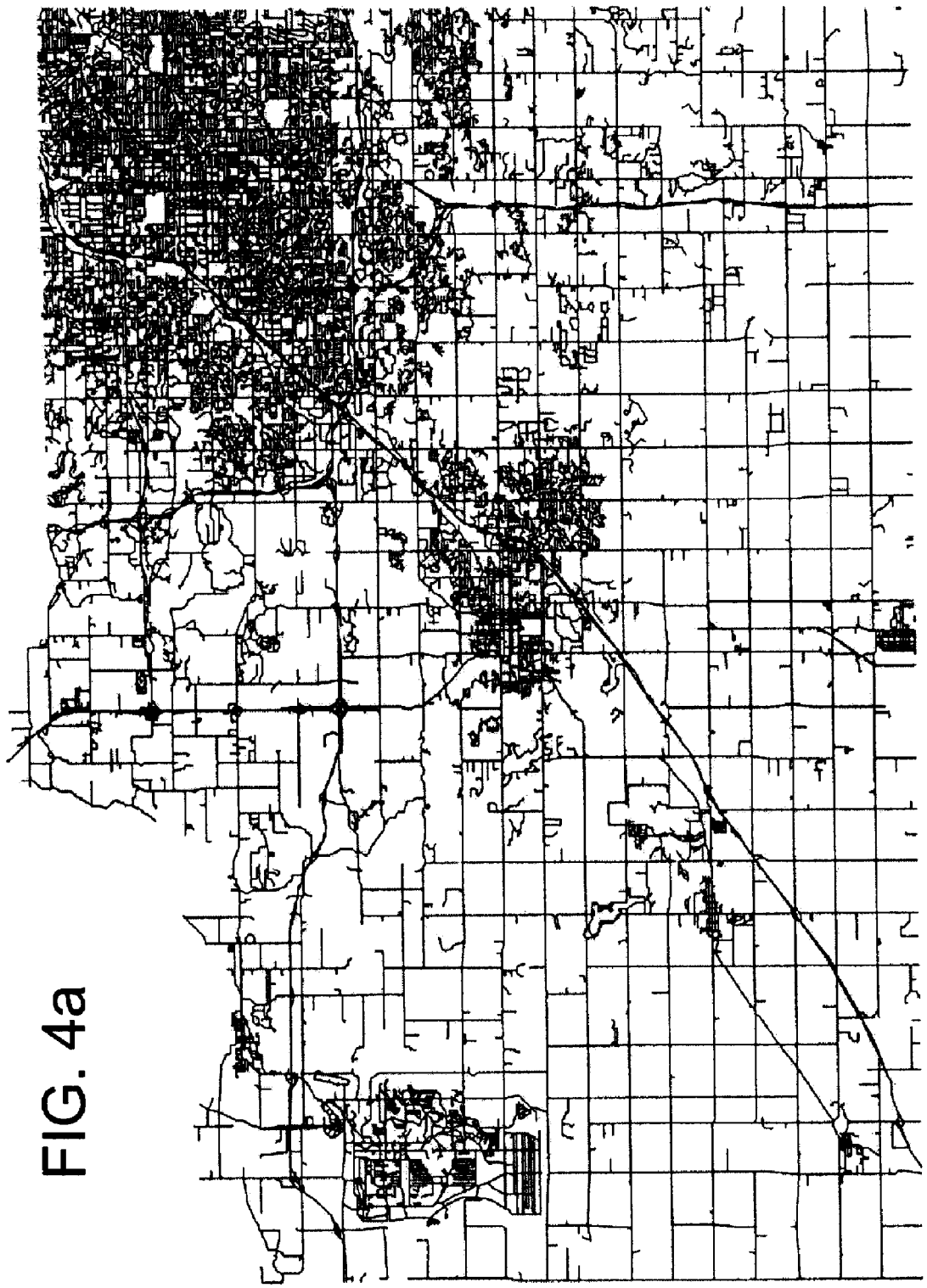
FIG. 4a illustrates a sample map built to contain three populated layers.
Figure 4B:
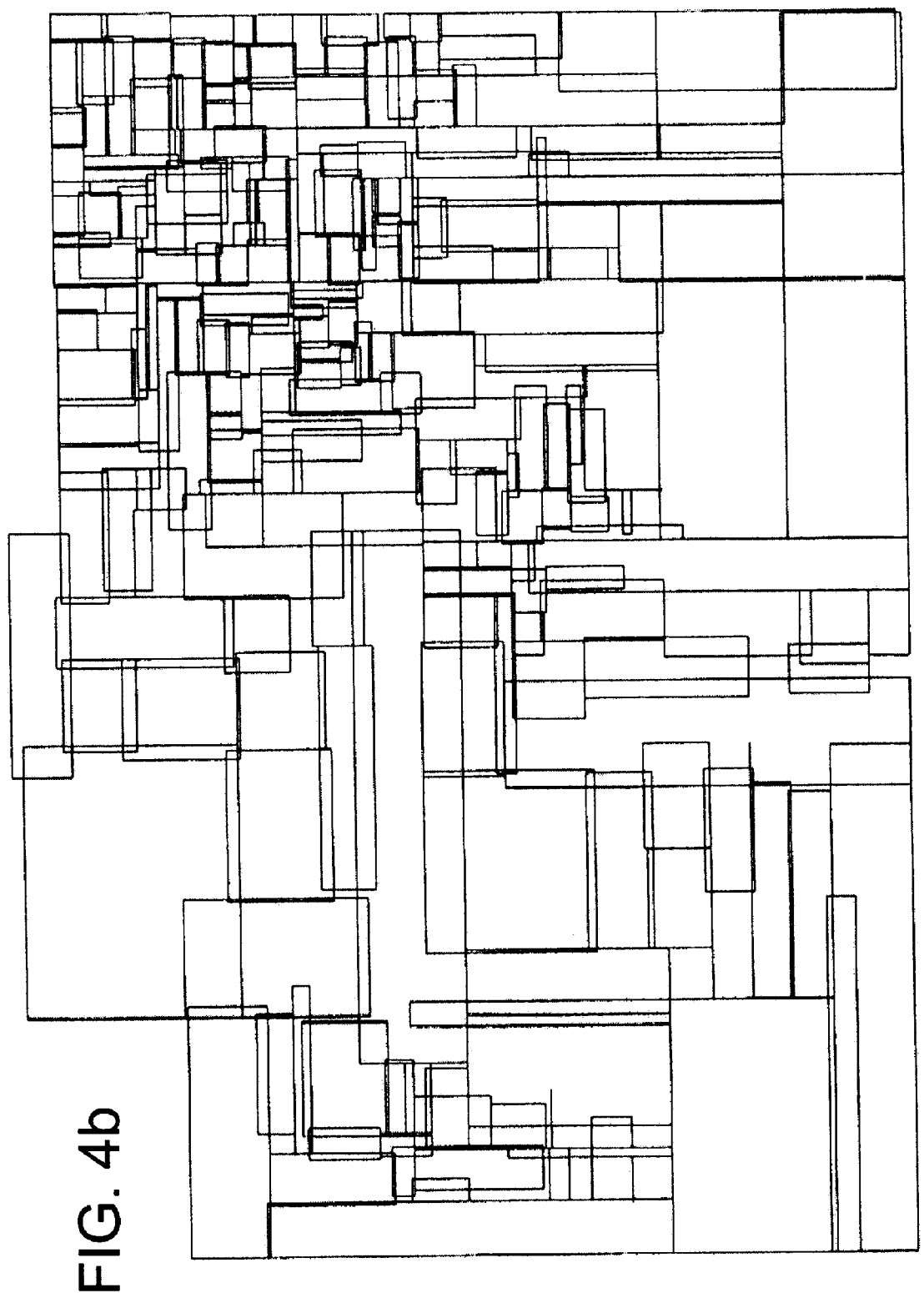
FIGS. 4b and 4c are, respectively, diagrammatic representations of minimum bounding rectangles of nodes at a first layer of an R-Tree constructed with and without the utilization of the principles of the present invention.
Figure 4C:
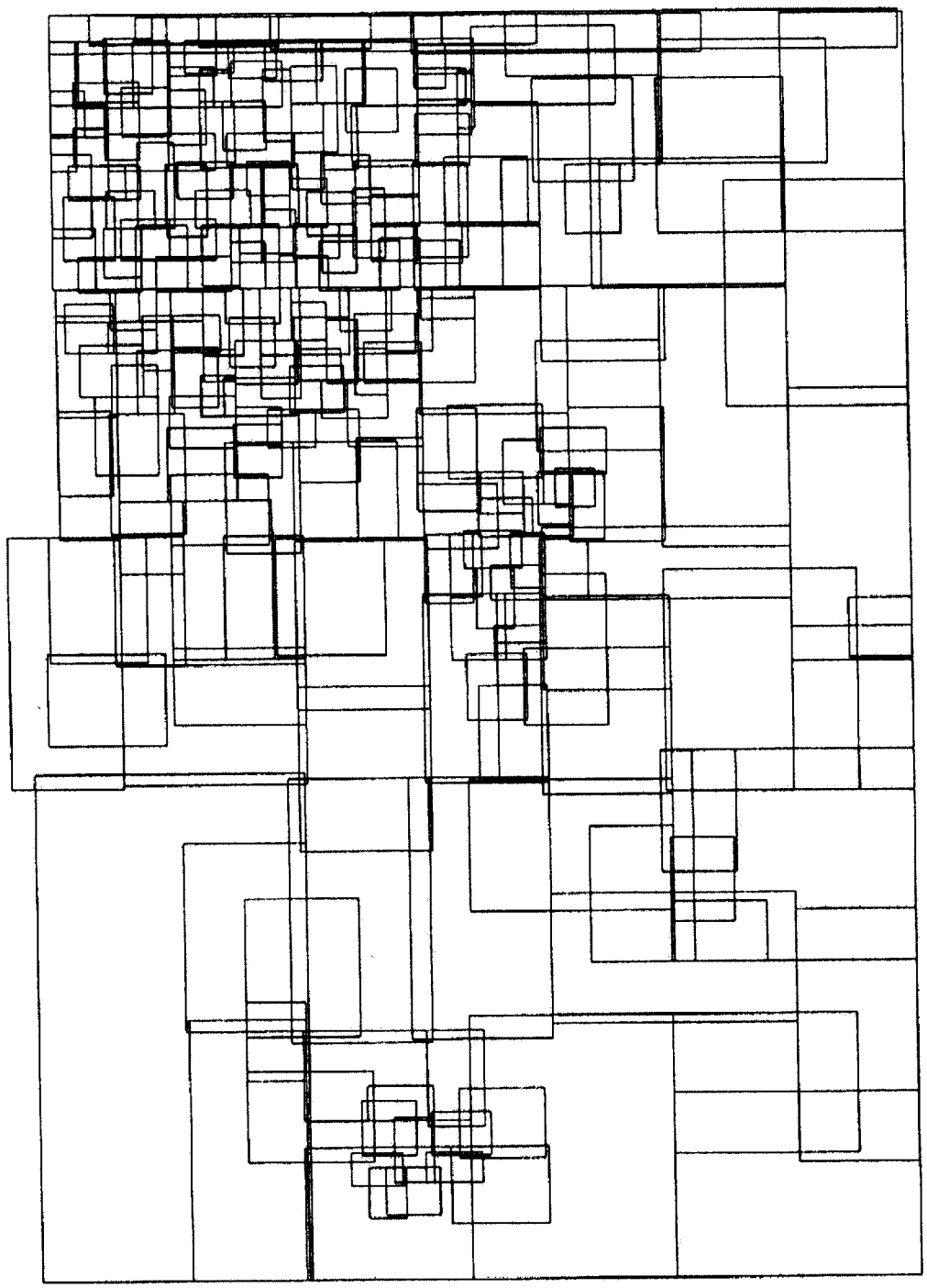

With reference now to FIG. 4a, a sample map built to contain three populated layers (e.g., levels zero, one, and two) is illustrated. As can be seen, the northeast corner of the map is the most densely populated with features. With reference to FIG. 2, a presentation of minimum bounding rectangles, representing the map and features illustrated in FIG. 4a, is illustrated, wherein the representation of FIG. 4b is constructed utilizing the principles of the present invention. Particularly, the illustration of FIG. 4b illustrates the presentation of minimum bounding rectangles for the map of FIG. 4a, wherein the packing technique (PACKALG) selected minimizes the overlap of minimum bounding rectangles in each buffer storage location. Running PACKALG on data indicative of a first layer of the map of FIG. 4a produces the result shown in FIG. 4b. Particularly, the total area of overlap among regions, or minimum bounding rectangles, in square units, is 0.06. The average overlap area, as a percentage of total region, is 41.8%, and the average number of regions intersecting a given region is 5.6. The total number of regions generated by the present invention, and thus illustrated in FIG. 4b is 245 regions. In contrast, FIG. 4c is an illustration of the minimum bounding rectangles at the lowest (or highest resolution) level, of the map in FIG. 4a, when no buffering in accordance with the present invention is carried out. In FIG. 4c, the total area of overlap among regions, in square units, is 0.14, more than twice the figure when the techniques of the present invention were utilized. The average overlap area, as a percentage of total region area, is 70.3%, and the average number of regions intersecting a given region is 7.7. The total number of regions generated, without the buffering technique of the present invention, is 233 regions as illustrated in FIG. 4c. Accordingly, it can readily be seen that utilization of the present invention optimized grouping of features when compared to the situation where the present invention was not utilized.

Figure 4D:
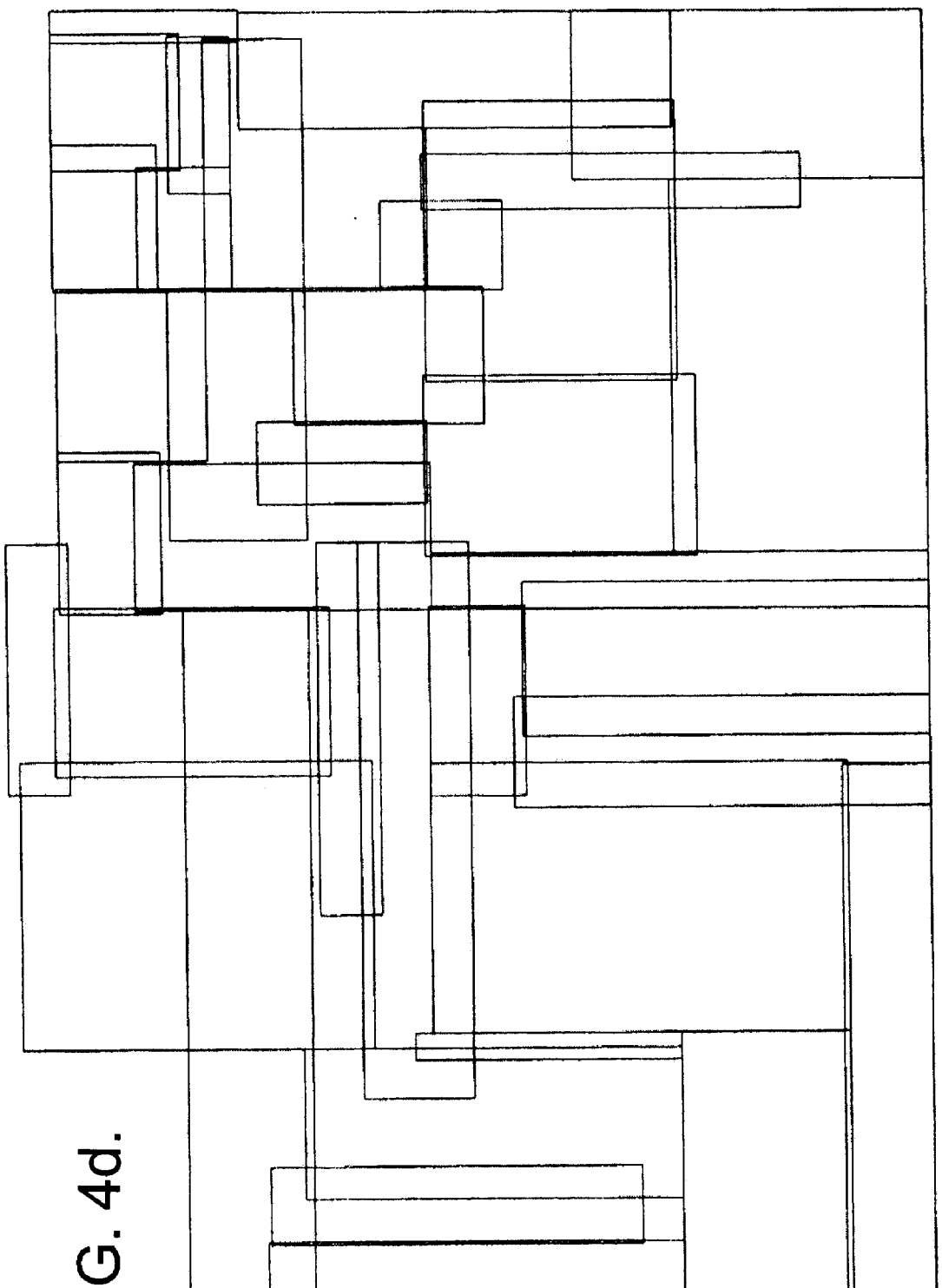
FIGS. 4d and 4e are, respectively, diagrammatic representations of minimum bounding rectangles of nodes at a second layer of an R-Tree constructed with and without the utilization of the principles of the present invention.
Figure 4E:
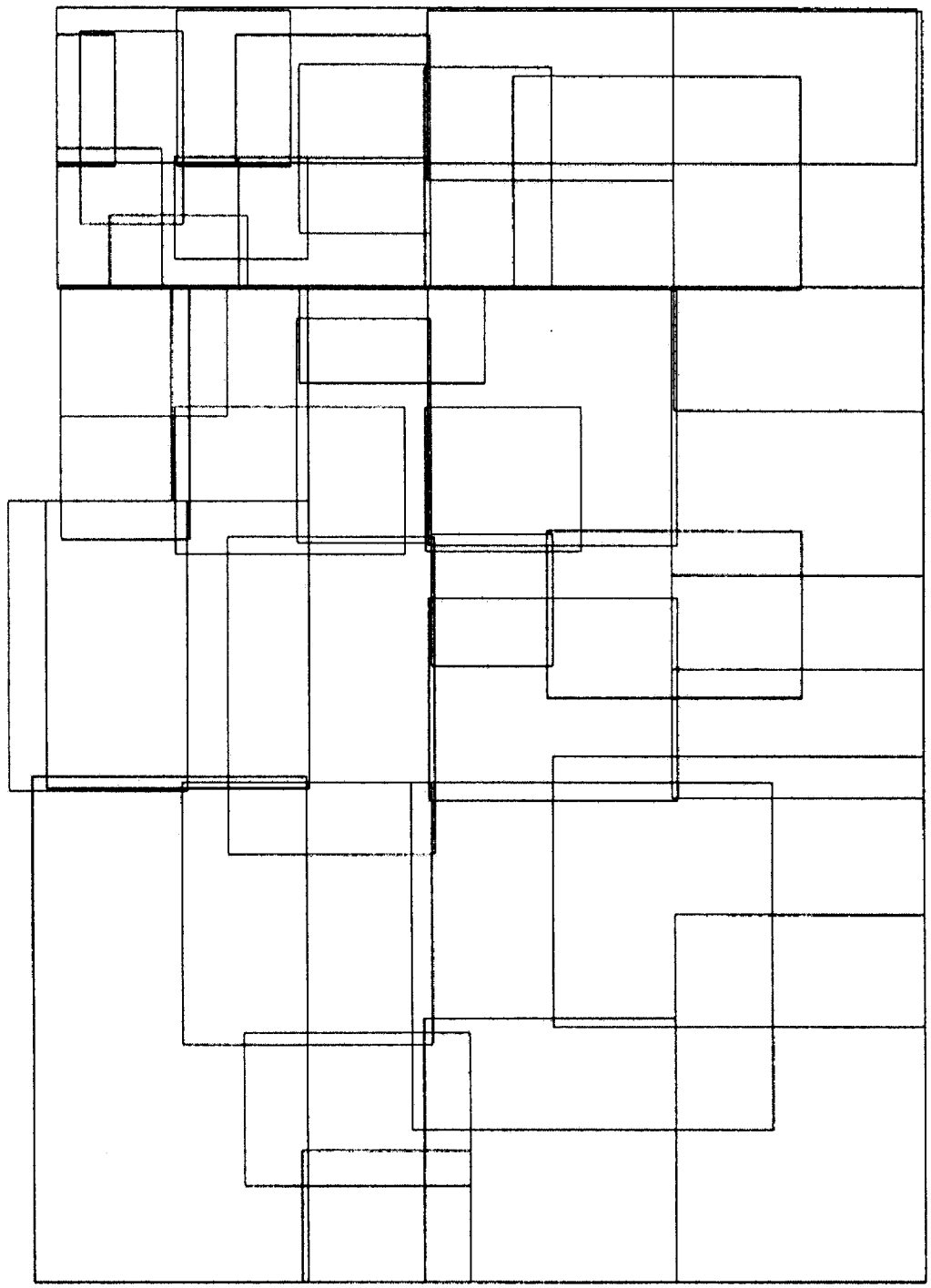

With reference to FIGS. 4d and 4e, FIG. 4d illustrates the presentation of minimum bounding rectangles for the features illustrated in the map of FIG. 4a, at a second layer, or level one of the map. In accordance with the principles of the present invention, when an R-Tree was constructed utilizing the packing technique for minimizing the overlap of minimum bounding rectangles, the total area of overlap among the regions, in square units, of the illustration of FIG. 4d is 0.08. The average overlap area, as a percentage of total region area, is 47%, and the average number of regions intersecting a given region is 5.1. The total number of regions is 37. In contrast, when an R-Tree was constructed without the benefit of the buffering/packing technique of the present invention, as represented in FIG. 4e, the total area of overlap among regions is 0.16, the average overlap area, as a percentage of the total region area, is 73.5, and the average number of regions intersecting a given region is 6.6. The total number of regions is 38. Thus, again, clustering or grouping of regions at the next highest layer of the map is more optimum when utilizing the principles of the present invention.

Figure 4F:
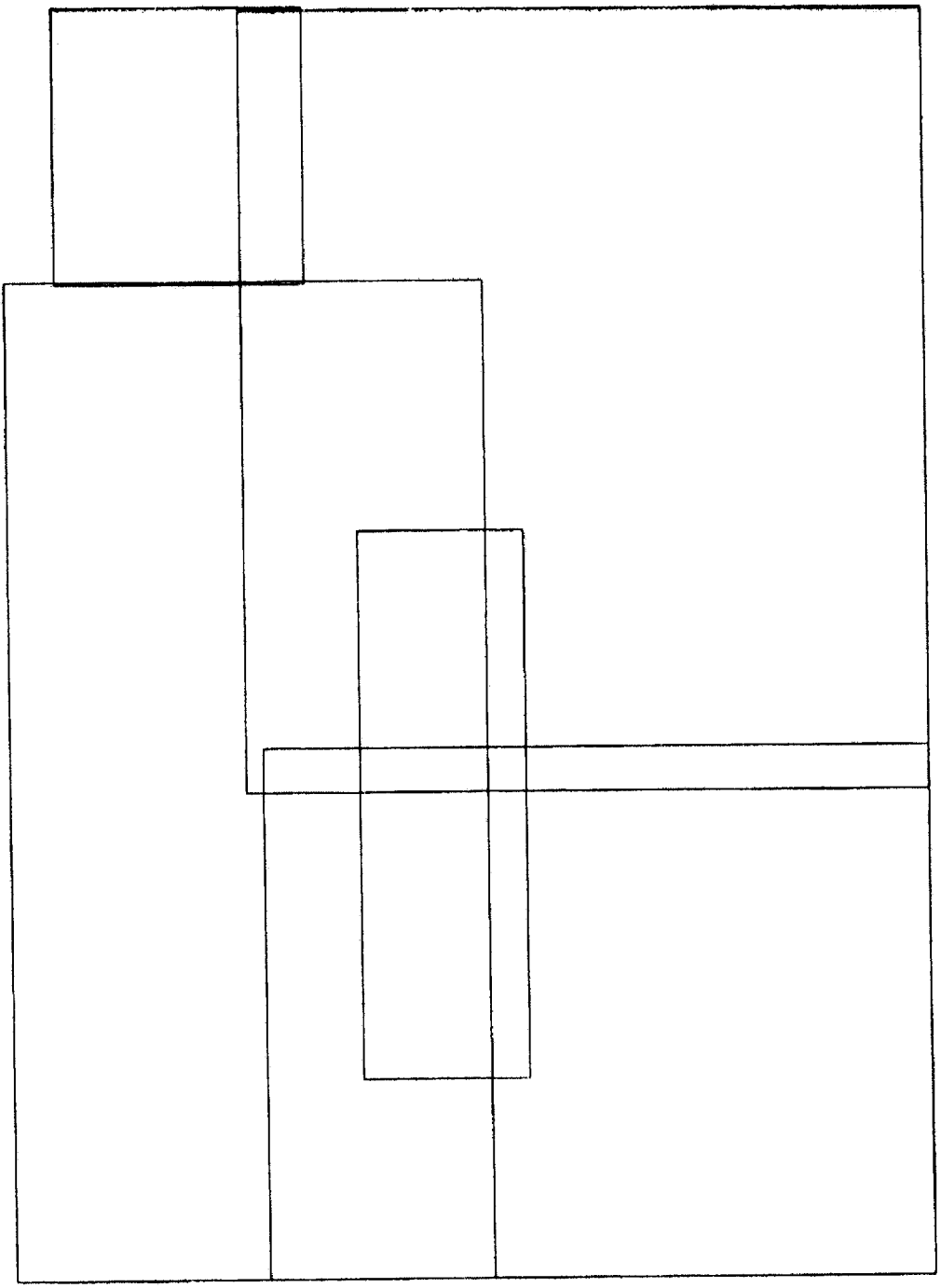
FIGS. 4f and 4g are, respectively, diagrammatic representations of minimum bounding rectangles of nodes at a third layer of an R-Tree constructed with and without the utilization of the principles of the present invention.
Figure 4G:
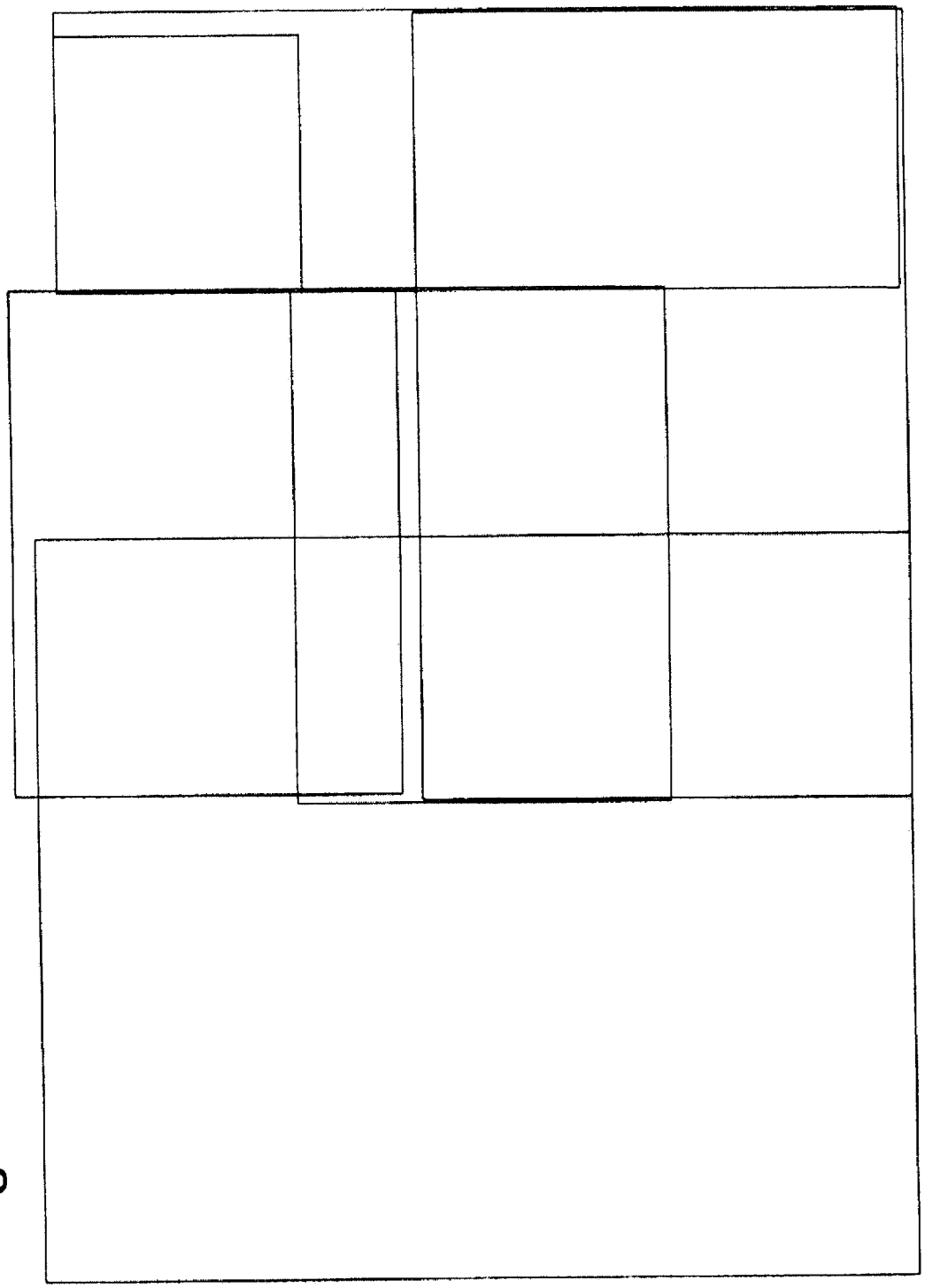

With reference now to FIGS. 4f and 4g, FIG. 4f illustrates a representation of minimum bounding rectangles utilizing the packing technique of the present invention for minimizing overlap of the minimum bounding rectangles at the next highest layer (or level 2) of the map of FIG. 4a. In the illustration of FIG. 4f, the total area of overlap among regions, in square units, is 0.08. The average overlap area, as a percentage of total region area, is 48%, and the average number of regions intersecting a given region is 3.2. The total number of regions is 5 regions. In contrast, in the illustration of FIG. 4g, which illustrates the minimum bounding rectangles at the third layer of an R-Tree constructed to store and access the map of FIG. 4a, the total area of overlap among regions, in square units, is 0.14, the average overlap area, as a percentage of total region area is 77.1%, and the average number of regions intersecting a given region is 3.7. The total number of regions is 6 regions.

Accordingly, given that maps were constructed with approximately the same number of regions at each level, the numbers show that buffering to minimize overlap, in accordance with the principles of the present invention, does have a positive effect. In particular, the results imply that the system will likely need to examine fewer regions for a given map area to render the map, if buffering, in accordance with the principles of the present invention, is used. Also, since much more, on average, of each region is free of overlaps, an embedded system embodying the illustrated R-Tree structure is more likely to improve the speed of processing, and particularly, the speed in which data must be searched and displayed on a display.

With reference now to FIGS. 5 and 6, FIG. 5 illustrates a portable electronic device (generally designated by the reference numeral 200) according to the present invention. An electronic device 200 of FIG. 5 is oriented along a vertical or horizontal axis, such as when held by a user, as illustrated in the vertical mode. The portable device 200 includes a housing 202, having a face plate 204, and side walls and a back wall (not shown). Portable electronic device 200 further includes an antenna 206 mounted at one corner of the housing 202.

The face plate 204 is substantially rectangular in shape. The face plate 204 securely receives a display screen 208, and a control panel 210. The control panel 210 includes a plurality of push button type keys 212 which afford the user control over the portable device 200. Optionally, a directional toggle pad 214 may be included within the control panel 210. In one application, such as when utilizing the portable device within a global positioning system, the toggle pad 214 affords the ability to scan through a large map, constructed in accordance with the principles of the present invention, and stored in a memory of the portable electronic device 200, and to display portions of the scanned map on the screen 208. Optionally, the panel 210 may include a speaker/microphone combination, represented by reference numeral 216, to afford communications.

Preferably, display screen 208 is located below the control panel 210 (when oriented along a vertical axis) to afford easy data entry by the user. When thusly oriented, the display screen 208 is controlled to orient data upon the screen such that side 218 of the screen 208 represents the top of the data to be displayed, while side 220 of the screen 208 represents the bottom. Thus, the data is preferably displayed from the top 218 to the bottom 220 of screen 208.

With reference now to FIG. 6, an electronic circuit of the portable electronic device 200 is illustrated in block form. The electronic circuit includes a processor 222 which communicates via the control panel, designated as keypad 210, via line 211. The processor communicates via line 209 with the display screen 208. The electronic circuit further includes a memory 224, which is accessed by the processor 222 via line 223. The antenna 206 is connected to processor 222, via line 207. The electronic circuitry of portable electronic device 200 is powered by a power source (not shown), in a conventional manner.

Housing 202 of portable electronic device 200 houses processor 222, memory 224, display 208, and keypad 210, where a display screen 208 and keypad 210 are accessible at the exterior of the housing. In a preferred embodiment, portable electronic device 200 is utilized in conjunction with a global positioning system, for acquiring signals transmitted from satellites in geosynchronous orbit. In such an embodiment, processor 222 includes means for calculating, by triangulation, the position of the portable electronic device 200. In such an embodiment, in an image file, indicative of a selected map, is embedded in memory 224. In accordance with an aspect of the present invention, the image file embedded in memory 224 comprises spatial data indexed according to an associated R-Tree index structure, constructed in accordance with the principles of the present invention.

Accordingly, as will be readily understood, an operator of portable electronic device 200 controls processor 222 through use of control panel 210 to display map images on display screen 208. Utilizing control panel 210, the operator can select various zoom levels, corresponding to layers of the embedded R-Tree index structure, for a particular geographic region desired to be displayed on display screen 208. Data, indicative of map to be displayed, is accessed utilizing the R-Tree index structure embedded in memory 224, according to inputs by the operator utilizing control panel 210.

Accordingly, the present invention provides a method and system for developing an R-Tree structure which provides quick and efficient access to leaf level spatial data. Additionally, as will be appreciated in view of the foregoing detailed description, the present invention permits construction of an R-Tree including spatial data, and not just indexing data, at upper levels of the R-Tree. The present invention permits specification, prior to R-Tree construction, of parameters for constructing the R-Tree, including the provision of more prominent feature types at each higher level in the R-Tree. Thus, the present invention provides tightly-packed data and efficient access to high resolution spatial data for geographically specific queries, together with successively more generalized and simplified versions of the spatial data for queries covering larger geographical areas. An R-Tree constructed in accordance with the principles of the present invention is constructed to approximately level the amount of information that an application has to retrieve for each zoom range to be displayed on a display screen 208 of a portable electronic device 200 of the present invention, effectively enabling the portable electronic device 200 to draw map images in about the same drawing time, independent of the selected zoom range.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method for packing spatial data features into nodes of an R-Tree, said method comprising:
    (a) providing a buffer having a plurality of storage locations;
    (b) calculating a minimum bounding rectangle of each said spatial data feature to be packed;
    (c) sorting said spatial data features to be packed into a table of records;
    (d) until a predetermined condition exists, individually selecting records from said table of records and temporarily storing the spatial data associated with each said selected record in one of said storage locations of said buffer;
    (e) upon an occurrence of said predetermined condition, splitting the data associated with said selected records into first and second portions, and temporarily storing the spatial data associated with said first portion of said selected records in one storage location of said buffer and temporarily storing the spatial data associated with said second portion of said selected records in another one of said storage locations of said buffer;
    (f) repeating steps (d) and (e) until no storage locations of said buffer remain available for storing data;
    (g) then removing from said buffer the spatial data in a determined one of said buffer locations, said removed data being committed to the R-Tree being packed.

2. The method as set forth in claim 1, wherein said step of sorting said spatial data features to be packed into a table of records comprises:
    applying fractal geometry to the said spatial data to be packed.

3. The method as set forth in claim 2, wherein said step of applying fractal geometry to the said spatial data to be packed comprises:
    applying the Hilbert Space-Filling Curve to a selected location of each said calculated minimum bounding rectangle.

4. The method as set forth in claim 1 wherein, after an occurrence of said predetermined condition and after said splitting of the data selected records into first and second portions, the step of temporarily storing data associated with a next record, selected from said table, further comprises:

selecting a one of said buffer storage locations, already having spatial data stored therein, for storage of the data associated with said next selected records, said stored spatial data in each buffer storage location having a minimum bounding rectangle with a perimeter, said step of selecting one of said buffer storage locations comprising:

determining which said perimeter will increase the least upon addition of the data associated with said next selected record.

5. The method as set forth in claim 1 wherein, after an occurrence of said predetermined condition and after said splitting of the data of selected records into first and second portions, the step of temporarily storing data associated with a next record, selected from said table, further comprises;

selecting a one of said buffer storage locations, already having spatial data stored therein, for storage of the data associated with said next selected record, said stored spatial data in each buffer storage location having a minimum bounding rectangle with an area, said step of selecting one of said buffer storage locations comprising:

determining which said area will increase the least upon addition of the data associated with said next selected record.

6. The method as set forth in claim 1 wherein, after an occurrence of said predetermined condition and after said splitting of the data of selected records into first and second portions, the step of temporarily storing data associated with a next record, selected from said table, further comprises:

selecting a one of said buffer storage locations, already having spatial data stored therein, for storage of the data associated with said next selected record, said stored spatial data in each buffer storage location having a minimum bounding rectangle, said step of selecting one of said buffer storage locations comprising:

determining which said storage location will have the least overlap of minimum bounding rectangles upon inclusion of the data associated with the next selected record.

7. The method as set forth in claim 1, wherein said step of splitting comprises:

applying a quadratic split to the data associated with the selected records.

8. The method as set forth in claim 1, wherein said step of splitting comprises:

determining when a preexisting condition exists, said preexisting condition being when an estimate of a data storage requirement for the data to be stored in one of said buffer storage locations exceeds a selected upper threshold.

9. The method as set forth in claim 1, wherein said step of splitting comprises:

determining when a preexisting condition exists, said preexisting condition being when the number of records associated with a buffer storage location exceed a selected upper threshold.

10. The method as set forth in claim 1, wherein said spatial data represents geography, wherein said step of splitting comprises:

determining when a preexisting condition exists, said preexisting condition being when the geography represented by the spatial data to be stored in one of said buffer storage locations exceeds a selected upper threshold.

11. The method as set forth in claim 1, wherein said spatial data represents geographic area, said step of removing comprising:

selecting that data, stored in one of said buffer storage locations, which most likely corresponds to a geographic area furthest from the geographic area corresponding to the data associated with a next record selected from said table.

12. The method as set forth in claim 11, said step of removing further comprising:

applying fractal geometry for selecting the data to be removed from said buffer.

* * * * *